United States Patent
Wafzig

[19]

[11] Patent Number: 6,117,042
[45] Date of Patent: Sep. 12, 2000

[54] CONTINUOUSLY VARIABLE TOROIDAL DRIVE

[75] Inventor: Jürgen Wafzig, Eriskirch, Germany

[73] Assignee: ZF Friedrichshafen AG, Friedrichshafen, Germany

[21] Appl. No.: 09/203,846

[22] Filed: Dec. 2, 1998

[30] Foreign Application Priority Data

Dec. 17, 1997 [DE] Germany ............... 197 56 150

[51] Int. Cl.$^7$ ................................ F16H 15/38
[52] U.S. Cl. ............................. 476/40; 476/42
[58] Field of Search ................. 476/40, 41, 42, 476/46

[56] References Cited

U.S. PATENT DOCUMENTS

| | | |
|---|---|---|
| 2,127,588 | 8/1938 | Erban . |
| 2,152,796 | 4/1939 | Erban . |
| 2,239,087 | 4/1941 | Erban ........................ 476/41 |
| 3,739,658 | 6/1973 | Scheiter . |
| 5,067,360 | 11/1991 | Nakano . |

FOREIGN PATENT DOCUMENTS

| | | | |
|---|---|---|---|
| 197 03 544 A1 | 8/1998 | Germany . | |
| 1-229158 | 9/1989 | Japan ........................ 476/42 |
| 4-321854 | 11/1992 | Japan ........................ 476/40 |

OTHER PUBLICATIONS

Japanese Patent Abstract, 4–321854 (M–1387), vol. 17, No. 151 dated Mar. 24, 1993 to Nissan Motor.

Japanese Patent Abstract, 7–019308A, dated Jan. 20, 1995 to Mazda Motor Corp.

*Primary Examiner*—David A. Bucci
*Assistant Examiner*—William C Joyce
*Attorney, Agent, or Firm*—Davis and Bujold

[57] ABSTRACT

The continuously variable toroidal drive has one input shaft and two input disks situated co-axially thereto with toroidal inner surfaces wherein the input disks and the output disks form pairs of disks disposed with mirror symmetry relative to each other and side by side. The input shaft is surrounded by a coaxial hollow shaft upon which are rotatably supported the two output disks and a first input disk; the second input disk being non-rotatably connected with the hollow shaft. The hollow shaft has a cam flange which together with the first disk is pressed apart by a roller-shaped pressure device, the pressure device being held by a substantially U-shaped supporting structure which is connected with the input shaft, wherein drive pressure is applied without relative rotation between the input disks.

5 Claims, 2 Drawing Sheets

1

CONTINUOUSLY VARIABLE TOROIDAL DRIVE

The invention relates to a continuously variable toroidal drive.

BACKGROUND OF THE INVENTION

Such a continuously variable toroidal drive usually has input and output disks disposed co-axially in relation to a common shaft and arranged in pairs to define toroidal inner surfaces with friction wheels disposed between the pairs of input and output disks. The fiction wheels are in frictional contact both with the input disks and with the output disks and transmit the torque transmitted by them from the input disk to the output disk by frictional engagement, the speed of the friction wheels being higher the greater distance between their contact point with the input disk and the axis of the disks rotation. The speed of the output disks, on the other hand, is higher the closer the contract between friction wheel and output disk is to that axis of rotation. Accordingly, by swiveling the friction wheels, the speed of the output disk can be continuously adjusted as desired. To this end the axes of rotation of the friction wheels are supported on a carrier which is controllable by a swiveling device.

The fundamental principle of such a continuously variable toroidal drive has already been described in U.S. Pat. No. 2,152,796 which was published in the year 1939. Therein are provided two pairs of concave input and output disks between which are situated tiltably supported friction wheels so that a torque transmitted, via an input shaft, to the input disks and the friction wheels, depending on the relative position of the friction wheels with a reduction ratio independent thereof, via the output disks, a gear stage and a hollow shaft to a summation gear unit in the form of planetary gear. The web of the planetary gear drives an output shaft which is connected, for example, with the input gears of a motor vehicle. The output shaft can be disposed parallel to the output shaft and spaced therefrom. The output gear and the two output disks are rotatably supported on the sleeve which at its ends is supported in bearing brackets. The arrangement of the bearing brackets respectively between an input and output disk presupposes a sufficiently large space between said disks.

The gear unit according to the U.S. Pat. No. 3,739,658 also has a pull-and-push variator with two input and output disks disposed in pairs between which are situated tiltably supported friction wheels. In said construction, there is a bearing bracket that is a component part of the housing and is spatially situated between the two output disks. The power flowing from the output disks is fed via a planetary gear, which in addition acts as differential, to a hollow shaft. The hollow shaft is non-rotatably connected with the output gear and rotatably held by ball bearings in the bearing bracket.

The output gear is in operative connection with a gear which is secured non-rotatably to the housing of a torque converter. The latter drives the output shaft of the gear unit. The arrangement of the torque converter on the input of the output shaft implies a relatively large center distance between input and output shafts of the gear unit. The use of said gear unit are narrowly limited, since the installation space required is not always available.

From U.S. Pat. No. 5,067,360 has become known a continuously variable toroidal drive having an input shaft that penetrates a housing front wall and two pairs of toroidal input and output disks between which are situated also tiltably supported friction wheels by means of which the desired reduction ratio can be set. With the input shaft is associated a cam flange firmly connected with it which acts upon a roller-shaped pressure device in direction of the first input disk which is firmly connected with a torque shaft which penetrates the gear unit. The second input disk is also firmly connected with the torque shaft and thereby is offset in rotation while the two output disks arranged mirror symmetrically to each other and between the two input disks are rotatably supported on the torque shaft and jointly act upon an output gear in direction of an output shaft.

German Patent Application No. 197 03 544 describes a gear unit in which the input power is directly transmitted in a first power range from an input shaft to an output shaft and in a second power range is transmitted via a continuously variably adjustable toroidal drive having interacting toroidal treads disposed in pairs between which roller bodies move and a planetary gear wherein the first power range corresponds to a first forward drive range in which the input power is transmitted via the variator to the output shaft, while the planetary gear rotates as unit and wherein on the first power range another power range adjoins which corresponds to a range of higher forward drive speed in which the input power is fed with power distribution directly and via the variator to the planetary gear and through this is transmitted cumulatedly to the output shaft.

In toroidal drive systems with power distribution there often appears during shifting, high amplitudes of the torque which, when using the customary mechanical axially acting pressing devices, lead to turning angles between the two spaced apart input disks. Besides, in toroidal drive systems with power distribution, variator torque in the power distributed range is unequal to the engine torque. Since the pressing device is torque dependent, both input disks must draw together and this takes place via angular disks in which the forward input disk on the input side, is rotated by up to 60° relative to the shaft and thus relative to the rear input disk. In a push/pull change the complete turning angles are achieved in well under a second.

For the pressing devices, designed as rollers, this means accelerations or decelerations on the forward input disk which the rollers on the rear do not experience. Depending on the acceleration or deceleration, this increases the slip on the forward and rear rollers.

The problem on which the present invention is based is to prevent any angular twists between the front and rear input disks in a power distribution toroidal drive where the axial force is transmitted via a roller-shaped pressure device.

SUMMARY OF THE INVENTION

According to the invention there is provided a continuously variable toroidal drive having: an input shaft (1), two input disks (9, 12) with toroidal-shaped inner surfaces disposed co-axially on said input shaft, two output disks (10, 11) with toroidal-shaped inner surfaces disposed co-axially about said input shaft, the input disks and the output disks forming pairs of disks (9, 10 and 11, 12) disposed in mirror image symmetry relative to each other and side by side, an output gear (13) between said output disks, a pressure device (6) for introducing drive pressure, a hollow shaft (2), which co-axially surrounds said input shaft, said first input disk (9) and both output disks (10, 11) being rotatably supported on said hollow shaft (2) and said second input disk (12) being non-rotatably connected with said hollow shaft, wherein; said input shaft (1) is provided with a substantially U-shaped supporting structure (5), having a leg of the U carrying the pressure device in the form of a roller-shaped pressure device (6) between and in contact with the first input disk (9) a cam flange (17) of said hollow shaft (2), said pressure device (6) being designed so that drive pressure between said first input disk (9) and said cam flange (17) is applied in the same direction of rotation.

The toroidal drive designed, according to the invention, offers the advantage that no angular twist appears between forward and rear input disks so that the torque can be uniformly introduced in both input disks. The input shaft has no longer any tension rod function.

BRIEF DESCRIPTION OF THE DRAWINGS

The invention is described in detail herebelow, by way of example, with reference to the drawings which show the parts essential to understanding the toroidal drive designed according to the invention and in which.

DESCRIPTION OF THE PREFERRED EMBODIMENTS

Figure 1:
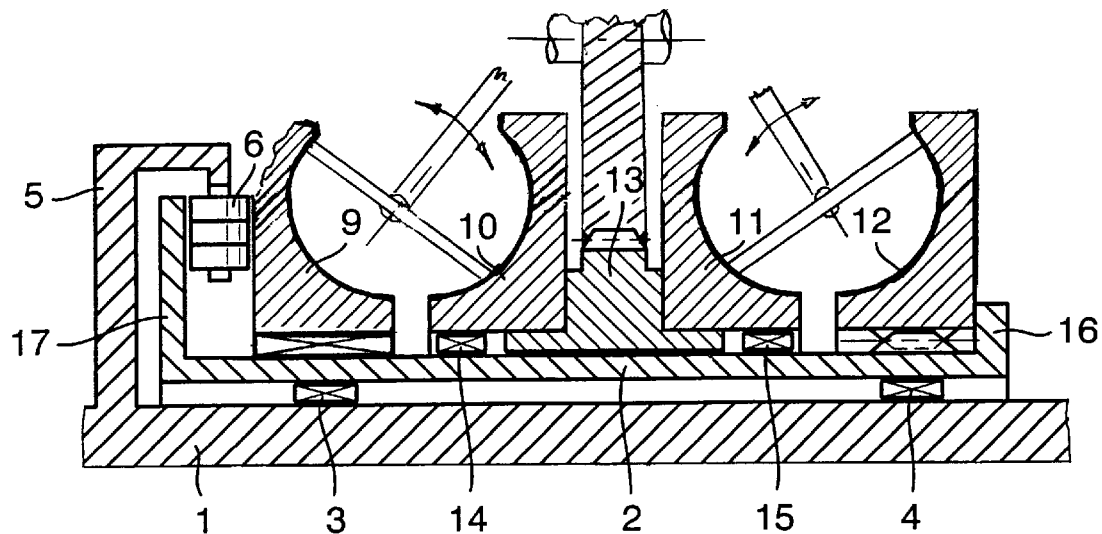
FIG. 1 is a longitudinal section through said essential parts.

FIG. 1 diagrammatically shows an input shaft 1 which is connected with a start-up component such as a torque converter or a hydraulically working starting clutch of an input engine of a motor vehicle. In a housing (not shown), two disk pairs are situated co-axially with the input shaft 1. One disk pair has an input disk 9 and an output disk 10 the surfaces of which facing each other define a toroidal space; the other disk pair has an input disk 12 and an output disk 11 situated opposite to it. The surfaces thereof facing each other being likewise toroidally shaped. In a manner known per se in each of the two units are preferably provided friction wheels, which are secured to tiltable carriers so that they can be tilted relative to the longitudinal axis of the input shaft 1. Said friction wheels are in frictional locking contact with the two surfaces facing them of the input disks 9, 12 and of the output disks 10, 11, the friction wheels of gear unit being situated symmetrically in relation to the axis of the input shaft 1.

If the friction wheels are now inclined by the swiveling device in relation to the longitudinal axis of the input shaft, then the points of contact of the periphery of the friction wheels move along the toroidal surfaces both of the input disks and of the output disks whereby the reduction ratio between an input and an output speed can be varied continuously.

The input shaft 1 extends in longitudinal direction through the toroidal drive and is provided at its front end with a supporting structure 5 which interacts with a pressure device 6 which is roller shaped.

Both the input disks and the output disks are supported on a hollow shaft 2 which co-axially surrounds the input shaft 1 and which via bearings 3, 4 is rotatably mounted thereon. Both output disks 10, 11 are rotatably supported on the hollow shaft 2 while the second input disk 12 is non-rotatably connected with the hollow shaft. With 13 is diagrammatically designated a gear which is pressurized by the two output disks 10, 11 and is connected with the output shaft (not shown).

At the end of the hollow shaft 2 facing the supporting structure 5 is a cam flange 17 which on an outer surface facing the pressure device 6 is provided with a curved tracks. The outer wall of the first input disk 9 is also provided with curved tracks adapted to the pressure device 6 and designed asymmetrically in relation to those of the cam flange 17.

The roller-shaped pressure device 6 is provided on the free short leg of the U-shaped supporting structure 5 so as to press on one side the first input disk 9 and on the other side on the cam flange 17 of the hollow shaft 2. To obtain the correct direction of rotation for the input disk 9, the pressure device 6 now has at least two superimposed rollers fixed on the same axis but having opposite directions of rotation relative to each other.

Figure 2A:
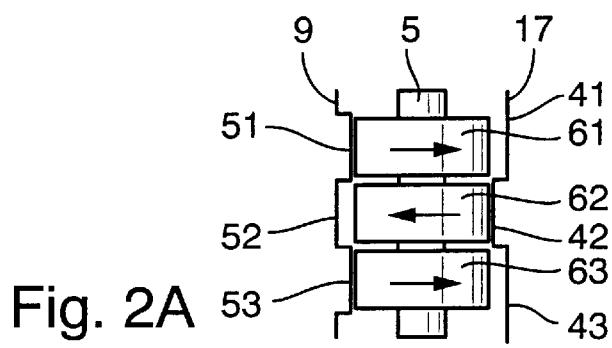
FIGS. 2A and 2B are an enlarged sideview of a pressure (pressing) device according to a first embodiment.

FIG. 2A diagrammatically shows a sideview of a preferred embodiment of a pressure device having three axially superimposed rollers 61, 62, 63, both rollers 61, 63 having the same direction of rotation while the roller 62 has an opposite direction of rotation, as indicated by the arrows. The rollers act together with the corresponding curved tracks 51, 52, 53 in the cam flange 17 or the curved tracks 41, 42, 43 in the input disk 9 in a sense such that the first input disk 9 has the same direction of rotation as the cam flange 17, which feeds part of the torque to the second rear input disk 12.

Figure 2B:
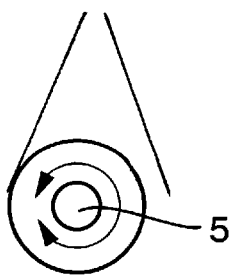

FIG. 2B diagrammatically shows a topview on the embodiment shown in FIG. 2A, the different directions of rotation of the topmost roller 61 and of the central roller 62 being indicated by the arrow.

Figure 4:
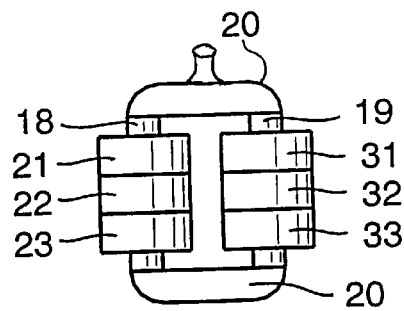
FIG. 4 illustrates a third embodiment of the pressure device.

FIG. 4 shows another embodiment which consists here of two sets of superimposed rollers 21, 22, 23 and 31, 32, 33 contacting each other axially, each set of rollers being supported respectively on axes 18 and 19 which extend parallel to each other and are situated in a fixture 20.

Figure 5:
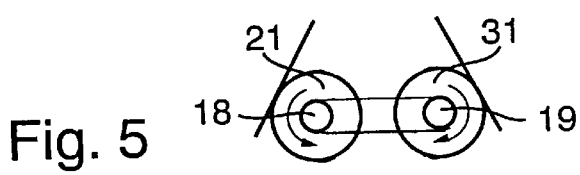
FIG. 5 is a different cross-section for arrangement of the pressure device shown in FIG. 4.

FIG. 5 shows a topview of said two roller sets wherein the plane which contains the axes 18, 19 situated parallel to each other extends parallel to the longitudinal axis of the input shaft 1 and of the hollow shaft 2.

Figure 6:
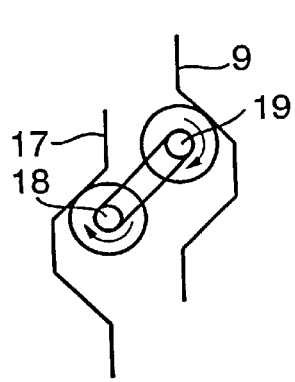
FIGS. 6 and 7 diagrammatically illustrate additional embodiments.
Figure 7:
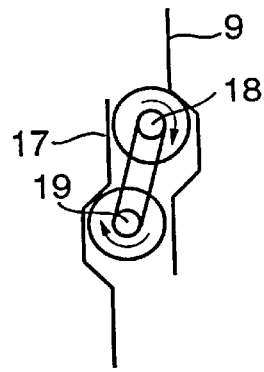

In the embodiments shown in FIGS. 6 and 7 the axes 18, 19 are situated in planes which form an angle with the longitudinal axis of the input shaft 1 or the hollow shaft 2.

Figure 3:
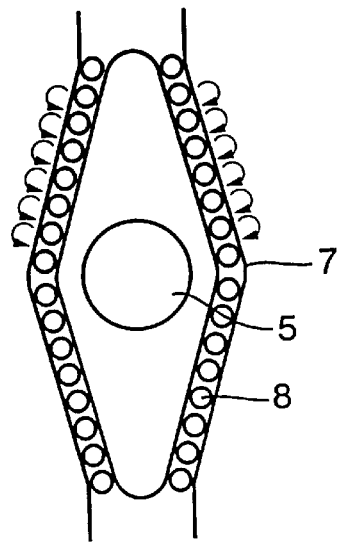
FIG. 3 is a topview of a second embodiment of a pressure device.

In another advantageous embodiment, instead of several superimposed, there can be provided wedging surfaces 7 with needle bearings according to FIG. 3 wherein several superimposed wedging surfaces 7 with opposite directions of rotation can be used.

By providing a pressure device with several rollers or wedging surfaces 7 with needle bearings as illustrated of which one part of each pressurizes the cam flange 17 and the other part the first input disk 9, the torque can be uniformly introduced both in the front input disk 9 and in the rear input disk 12 without an angular rotation occurring between said two disks. Let it also be indicated that the input shaft 1 has no twisting torque function at all.

What is claimed is:

1. A continuously variable toroidal drive having:

an input shaft (1), first and second input disks (9, 12) each having a toroidal-shaped inner surface disposed co-axially on said input shaft, first and second output disks (10, 11) each having a toroidal-shaped inner surface disposed co-axially about said input shaft, the input disks and the output disks forming pairs of disks (9, 10 and 11, 12) disposed in mirror image symmetry relative to each other and side by side, an output gear (13) located between said first and second output disks, a pressure device (6) having at least one roller for introducing drive pressure, a hollow shaft (2), which co-axially surrounds said input shaft, said first input disk (9) and both output disks (10, 11) being rotatably supported on said hollow shaft (2) and said second input disk (12) being non-rotatably connected with said hollow shaft, wherein;

said input shaft (1) is provided with a substantially U-shaped supporting structure (5), having a leg carrying the pressure device (6) between and in contact with the first input disk (9) and a cam flange (17) of said hollow shaft (2), said pressure device (6) being designed so as to provide drive pressure between said first input disk (9) and said cam flange (17).

2. The toroidal drive according to claim 1, wherein said pressure device (6) has at least two co-axially superimposed rollers (61, 62, 63) which rotate in opposite directions of rotation.

3. The toroidal drive according to claim 1, wherein said pressure device (6) is wedge-shaped and has, on a periphery thereof a plurality of needle bearings which rotate in opposite directions of rotation.

4. The toroidal drive according to claim 2, wherein the outer surfaces of said first input disk (9) and of said cam flange (17) in contact with said rollers (61, 62, 63) have tracks (41, 42, 43 and 51, 52, 53) disposed asymmetrically relative each other for meshing with the rollers of said pressure device (6).

5. The toroidal drive according to claim 2, wherein a plane, normal to axes of rotation (18, 19) of said rollers is oriented parallel to a longitudinal axis of said input shaft (1).

* * * * *